(12) United States Patent
Collini et al.

(10) Patent No.: US 10,648,679 B2
(45) Date of Patent: May 12, 2020

(54) DEVICE FOR DOMESTIC HOT WATER DISTRIBUTION

(71) Applicant: Quantia SAS, Aix en Provence (FR)

(72) Inventors: Arnold Collini, Marseilles (FR); Florent Iermann, Aix en Provence (FR); Gabriel Gormezano, Velaux (FR); Pascal Nuti, Meyreuil (FR)

(73) Assignee: QUANTIA SAS, Aix en Provence (FR)

( * ) Notice: Subject to any disclaimer, the term of this patent is extended or adjusted under 35 U.S.C. 154(b) by 621 days.

(21) Appl. No.: 15/310,813

(22) PCT Filed: May 15, 2015

(86) PCT No.: PCT/EP2015/060775
§ 371 (c)(1),
(2) Date: Nov. 14, 2016

(87) PCT Pub. No.: WO2015/173400
PCT Pub. Date: Nov. 19, 2015

(65) Prior Publication Data
US 2017/0074523 A1  Mar. 16, 2017

(30) Foreign Application Priority Data
May 15, 2014 (FR) .................................. 14 54347

(51) Int. Cl.
*F24D 17/00* (2006.01)
*F28D 21/00* (2006.01)
(Continued)

(52) U.S. Cl.
CPC .......... *F24D 17/0052* (2013.01); *E03C 1/044* (2013.01); *F28D 21/0012* (2013.01);
(Continued)

(58) Field of Classification Search
CPC ............. F24D 17/0052; F24D 2200/20; F28D 21/0012; E03C 1/044; E03C 2001/005; Y02B 30/18; Y02B 30/566
See application file for complete search history.

(56) References Cited

U.S. PATENT DOCUMENTS 4,398,308 A   8/1983   Berg
4,821,793 A   4/1989   Sheffield
(Continued)

FOREIGN PATENT DOCUMENTS

DE   3919543   12/1990
EP   0 985 888   3/2000
(Continued)

OTHER PUBLICATIONS

International Search Report dated Oct. 16, 2015 out of PCT Priority Application PCT/EP2015/060775 (6 pages).
(Continued)

*Primary Examiner* — Ibrahime A Abraham
*Assistant Examiner* — John J Norton
(74) *Attorney, Agent, or Firm* — Brinks Gilson & Lione (57) ABSTRACT

A heat exchanger that includes a portion for heat exchange with gray water, a portion for heat exchange with clean water, the heat exchanger being arranged to transfer heat between the gray water heat-exchange portion and the clean water heat-exchange portion during a distribution of water and thereby heat a feedwater to a first temperature, wherein the heat exchanger includes a first heating means arranged to achieve the heating of the feedwater, for heating the feedwater to a second temperature, and wherein the heat exchanger includes a second heating means arranged to keep the clean water heat-exchange portion at a temperature greater than or equal to the first temperature during a period without water distribution.

9 Claims, 2 Drawing Sheets

(51) Int. Cl.
*E03C 1/044* (2006.01)
*E03C 1/00* (2006.01)

(52) U.S. Cl.
CPC .... *E03C 2001/005* (2013.01); *F24D 2200/08* (2013.01); *F24D 2200/20* (2013.01); *Y02B 10/70* (2013.01); *Y02B 30/18* (2013.01); *Y02B 30/566* (2013.01)

(56) References Cited

U.S. PATENT DOCUMENTS

| | | | |
|---|---|---|---|
| 7,222,659 B2 * | 5/2007 | Levin | F28D 20/021 165/10 |
| 2009/0242005 A1 | 10/2009 | Gaus | |
| 2012/0145807 A1 * | 6/2012 | Martinez | E03C 1/044 239/135 |
| 2014/0338754 A1 | 11/2014 | Nuti | |

FOREIGN PATENT DOCUMENTS

| | | |
|---|---|---|
| FR | 2486060 | 1/1982 |
| FR | 2982012 | 5/2013 |
| GB | 2 442 801 | 4/2008 |
| JP | 60053735 A * | 3/1985 |
| WO | WO 2008/068500 | 6/2008 |
| WO | WO 2011/091756 | 8/2011 |
| WO | WO 2012/160330 | 11/2012 |

OTHER PUBLICATIONS

Written Opinion dated Oct. 16, 2015 out of PCT Priority Application PCT/EP2015/060775 (7 pages).

\* cited by examiner

DEVICE FOR DOMESTIC HOT WATER DISTRIBUTION

This application claims priority to International Application No. PCT/EP2015/060775 filed May 15, 2015 and to French Application No. 1454347 filed May 15, 2014; the entire contents of each are incorporated herein by reference.

The present invention relates generally to a device for distributing domestic hot water, and in particular to a heat exchanger arranged to recover the heat contained in waste water, and to transfer this heat to the water to be distributed.

Devices for distributing hot water integrating a heat recovery device as the one described for example in document U.S. Pat. No. 4,821,793, are known in the prior art. This document discloses a shower comprising a water-water coil exchanger for operating energy recovery from waste water. As a counterpart, this system notably has the drawback of being bulky and not very efficient for recovering a large amount of heat.

Moreover, document US2009/0242005A1 discloses a dishwasher equipped with Peltier modules for heating the cleaning water of the dishwasher. This system is not adapted to the production of domestic hot water because of the relevant temperature ranges. Indeed, in a dishwasher, the water is heated to 85° C., which is totally incompatible with the use for a shower for example. The result of this is a significant loss in efficiency and cooling of the water produced by this system would even have to be provided in order to use the water for domestic uses.

Document FR 2 486 060 describes a facility for treating waste waters of a dwelling with a heat recovery unit. On the other hand, the device in this document requires a considerable reserve of hot water (a hot-water reservoir), which complicates in particular the complete installation. Moreover, after a long period of non-use, the user must wait for the hot water to fill the supply conduits before being actually distributed to the tap.

Document FR 2 982 012 discloses a device for distributing domestic hot water with a heat exchanger. This system has the drawback of requiring a minimum priming period before being able to distribute truly hot water, which can inconvenience the user who must wait for the hot water, or begin to wash with water that is barely lukewarm.

Document GB 2 442 801 A discloses an electric shower assembly, that is a hot water distribution device with a heat exchanger and an electric heater in a water reserve separate from the exchanger.

An object of the present invention is to overcome the drawbacks of the above-mentioned documents of the prior art and in particular, to first of all propose a device for distributing domestic hot water with a heat exchanger for energy recovery, without a reserve buffer (without a hot-water reservoir), and which makes it possible to distribute hot water very rapidly.

For this purpose, a first aspect of the invention relates to a water-water type heat exchanger comprising:

a grey-water (or waste-water) exchange portion arranged to be connected upstream to a drain plug for recovering domestic waste water, and downstream to a discharge conduit, a clean-water exchange portion arranged to be connected upstream to a cold water supply system, and downstream to a distribution valve, the heat exchanger being arranged to carry out heat transfer between the grey-water exchange portion and the clean-water exchange portion during water distribution caused by opening the distribution valve, and thus to heat supply water to a first temperature, wherein the heat exchanger comprises a first heating unit arranged to complete the heating of the supply water simultaneously with water distribution, to heat a supply water to a second temperature greater than the first temperature, and wherein the heat exchanger comprises a second heating unit arranged to maintain, for a period without water distribution, the clean-water exchange portion and the water contained therein at a temperature at least equal to or greater than the first temperature.

The heat exchanger according to the present implementation allows integration into a hot-water distribution device without a hot-water reservoir, because the first heating unit allows water to be heated to the second temperature, which is that desired by the user. For example the second temperature is at least equal to 35° C. Ideally, the second temperature is at least equal to 40° C. Moreover, the distribution of hot water is immediate, even after a long period of non-use, because the second heating unit maintains at the first temperature the water which is contained in the clean-water exchange portion, which maintains the system constantly primed. It is therefore understood that the second heating unit is arranged to heat the clean-water exchange portion. The device is thus particularly simple, and requires only one cold water supply for distributing hot water, while still being able to supply hot water very quickly. In other words, the exchanger according to the present invention allows hot water to be supplied even without a hot water reservoir or a domestic hot water circuit and, with temperature maintenance, it is constantly primed. It is understood that the invention relates to an exchanger which integrates the first and second heating units and that it is in direct connection with the shower head or the distribution valve (i.e. without intermediate heating unit between the exchanger and the shower head). Finally, the exchanger according to the present implementation serves as a single heating unit for delivering domestic hot water.

Advantageously, the first heating unit and/or the second heating unit is arranged to directly heat the heat exchanger.

Advantageously, the first heating unit and/or the second heating unit is arranged to heat directly one wall of the heat exchanger.

Advantageously, the first heating unit and/or the second heating unit is arranged to heat directly at least one wall of the clean-water exchange portion.

Advantageously, the first heating unit and/or the second heating unit is in contact with at least the wall of the clean-water exchange portion.

Advantageously, the first heating unit and/or the second heating unit surrounds at least partially the clean-water exchange portion.

Advantageously, the exchanger comprises a thermally insulated housing which contains at least the clean-water exchange portion, and the first heating unit and/or the second heating unit is contained in the thermally insulated housing.

Advantageously, the first heating unit and/or the second heating unit is contained in the clean-water exchange portion.

Advantageously, the first heating unit and the second heating unit are electric. According to this implementation only one additional electrical outlet is required in addition to the cold water supply, to obtain hot water.

Advantageously, the first heating unit is a heat pump. This implementation makes it possible to increase the overall effectiveness of the system. It is possible to contemplate a heat pump of the ground-source or air-source type with in both cases a phase-changing heat transfer fluid.

Advantageously, the first heating unit is thermoelectric modules, or Peltier modules. It is then possible to contemplate operation as a heat pump.

Advantageously, the first heating unit is an electric resistor arranged to produce at least 3 kWh of energy when it is supplied with a first supply current, and the second heating unit comprises a potentiometer connected in series with the electric resistor, to limit the first supply current and cause the electric resistor to produce no more than 30 Wh or energy. This implementation is economical, because there is only a single resistive element which operates in two distinct modes, depending on whether the water is distributed or not. One power plug delivering 16 amperes is sufficient for supplying the system, and with a heat exchanger which recovers 80% of the heat of the waste water (grey water), the complete device has a COP at least equal to 3, and makes it possible to deliver hot water at 35° C. with a flow of at least 6.5 liters per minute. In other words, the first heating unit and the second heating unit have a common electric resistor. What differentiates them is the potentiometer, which belongs to the second heating unit, to control the power of the electric resistor.

Advantageously, the grey-water exchange portion and the clean-water exchange portion form a plate-type heat exchanger, with counter-flow. Ideally, the plate heat exchanger comprises at least 80 plates per exchange portion.

As an alternative, the first heating unit is a heat source operating using gas or fuel oil.

Advantageously, the heat exchanger comprises a thermal insulation unit arranged to thermally insulate at least the clean-water exchange portion. This implementation limits the loss of energy and limits the need for energy to maintain the clean-water exchange portion at the first temperature.

Advantageously, the thermal insulation unit comprises at least one sleeve made of plastic between an inlet and/or an outlet of one of the grey-water exchange portion or the clean-water exchange portion. This implementation limits the loss of energy by heat conduction by the piping (traditionally made of copper, a good conductor).

Advantageously, the heat exchanger comprises a pump arranged to accelerate at least temporarily a flow of grey water passing through the grey-water exchange portion. The pump according to this implementation can operate for brief periods, so as to make the flow turbulent in the grey-water exchange portion, to increase the effectiveness of the exchange. Moreover, the pump can then be used to discharge the waste water, if gravity cannot be used for reasons of limited space.

Advantageously, the pump is a membrane suction pump. According to this implementation, it is possible to even contemplate installing a sink or a shower below the discharge conduit, because the suction pump can flow back the grey water over a few meters of height. It is possible to provide a membrane pump capable of generating a pressure of 2.5 bars at least.

Advantageously, the heat exchanger comprises a filtration unit arranged upstream of the pump. The filtration unit can comprise a 1st filtration unit for large pieces of dust, in series with a 2nd filtration unit for small pieces of dust. The filtration unit for large pieces can have a mesh of 2 millimeters, and the unit for filtering small elements can have a mesh of 0.5 millimeter. This makes it possible to protect the pump. It is possible to contemplate installing these filtration units in a cartridge that can be unscrewed to perform easy cleaning.

Alternatively, the filtration unit comprises a filter, a casing containing the filter, the casing comprising an inlet arranged to be connected to the grey-water recovery drain plug, an outlet arranged to supply the grey-water exchange portion, the filter being arranged between the inlet and the outlet, the casing further comprising a cleaning outlet arranged on the same side of the filter as the inlet, and the exchanger comprises a cleaning valve connecting the cleaning outlet to the discharge conduit, the opening whereof causes cleaning of the filter. This implementation allows self-cleaning of the filter. The filter can be a filtering cartridge filter arranged to stop particles of a size greater than 100 microns for example.

Advantageously, the heat exchanger comprises a bypass arranged to divide an outlet flow of the clean-water exchange portion and to have a portion come into contact with the first heating unit, and to have another portion run in parallel with the first heating unit. This implementation makes it possible to adapt to the first heating unit, which can be limited in flow rate due to standard construction.

Advantageously, the heat exchanger comprises means of controlling (a heat control unit) the first heating unit arranged to control heating power depending on a water distribution flow rate. The system then consumes only what is necessary for the user's comfort. This is not an all-or-nothing operation.

Advantageously, the clean-water exchange portion comprises two outlets, the heat exchanger comprises means for measuring flow rate (a flow rate measuring unit) for each of the two outlets and the control unit of the first heating unit is arranged to control heating power depending on at least one flow rate of one of the outlets of the clean-water exchange portion. According to this implementation, the heat exchanger is capable of regulating heating power, hence water temperature, based on the indication of at least one of the flow rates of one of the outlets of the clean-water exchange portions. Consequently, there is no need to mix hot water with cold water to control the temperature with a certain overall flow rate, but rather the exchanger according to the present invention makes it possible to adapt the heating power depending on flow rate information from at least one outlet of the clean-water exchange portion.

Advantageously, the flow rate measuring unit comprises two flow meters, each arranged to measure the flow rate of one of the two outlets of the clean-water exchange portion.

Advantageously, the heat exchanger comprises the distribution valve which is a mixer tap with two inlets each connected to one of the outlets of the clean-water exchange portion, and one outlet delivering domestic water to a user. According to this implementation, the distribution valve is a simple mechanical mixer tap, with one hot water position and one cold water position for the user. However, the two inlets of the mixer tap are directly connected to the clean water exchange portion, but if the user sets the mixer tap to the hot water position, then the flow meter associated with the inlet will measure 100% of the flow passing through a first inlet, and the control unit will give the command to the first heating unit to operate at full power. On the other hand, if the user sets the mixer tap to the cold water position, the flow meters will give the information that 100% of the flow is running through the other inlet to the mixer tap, and then the control unit will cut off the operation of the first heating unit, which will lower the temperature of the distributed water. Thus the user will continue to use his mixer tap in the traditional manner, just as if he were mixing hot water and cold water, but the exchanger according to the present invention will, however, control the heating power depending on the flow of each of the inlets of the mixer tap.

Advantageously, the exchanger comprises means for controlling the pump (a pumping control unit) arranged to control the pump depending on the flow rates measured at each of the outlets of the clean-water exchange portion.

Advantageously, each exchange portion has an internal volume of less than two liters.

Advantageously, the grey water exchange portion is directly connected to the discharge conduit, and empties itself automatically. This implementation implies that the grey-water exchange portion does not contain water during periods of non-use, which avoids maintaining grey water, which would be ejected once the device is used again, at the first temperature.

Advantageously, the heat exchanger comprises means for controlling flow rate arranged for controlling a discharge flow rate of grey water out of the grey-water exchange portion depending on a grey-water inlet flow rate in the grey-water exchange portion. This implementation makes it possible to avoid having the sink or shower pan that is being supplied fill unintentionally.

Advantageously, the heat exchanger comprises at least one valve arranged to short-circuit a flow of cold grey water from the grey-water exchange portion, and direct this short-circuited flow directly from the drain plug toward the discharge conduit. This implementation avoids de-priming the device if cold water is ejected, the cold water will not pass through the grey-water exchange portion.

Advantageously, each exchange portion has two ends, the exchanger comprises at each end of each exchanger portion a valve of which one way is connected to the end of its exchange portion, and two other ways of each valve of an exchange portion are connected to the rest of the water circuit and to the two other ways of the valve of the other end of the exchange portion in question through T connectors, to be able to reverse the flows in each exchange portion. The reversal of the flow makes it possible to de-clog the grey-water exchange portion by causing reversed travel and by inverting the hot-water inlets and outlets. This makes it possible to dissolve soaps and/or grease and/or biological matter which may have solidified, become attached to or sedimented on the walls of the exchanger. At a minimum, the valves in question are three-way valves.

Advantageously, the heat exchanger comprises, downstream of the first heating unit, a valve arranged to direct the flow of hot water toward the distribution valve or toward the grey-water exchange portion. This implementation makes it possible to have very hot water (by reducing the flow rate and at the full power of the first heating unit) pass through the grey-water exchange portion, to dissolve solidified soap there for example.

Advantageously, the heat exchanger comprises means for storing heat (a heat storing unit), comprising or using at least one phase-change material. This implementation makes it possible to limit the use of the second heating unit, and to increase the recovery of energy during water distribution, to restore it during temperature maintenance, or during the next use.

A second aspect of the invention relates to a device for distributing domestic water comprising:
at least one heat exchanger according to claim 1 of the first above aspect,
a sink and/or a shower pan.

It is possible to contemplate integrating the heat exchanger according to the first aspect into bathroom or kitchen furniture for example.

Another aspect of the invention relates to a heat exchanger of the water-water type comprising:

a grey-water exchange portion arranged to be connected upstream to a drain plug for recovering domestic waste water, and downstream to a discharge conduit,
a clean-water exchange portion arranged to be connected upstream to a cold water supply system and downstream to a distribution valve,
the heat exchanger being arranged to carry out heat transfer between the grey-water exchange portion and the clean-water exchange portion during water distribution caused by opening the distribution valve, and thus to heat supply water to a first temperature,
wherein the heat exchanger comprises first heating unit arranged to complete the heating of the supply water simultaneously with water distribution, to heat the supply water to a second temperature greater than the first temperature, and
wherein the heat exchanger comprise a pump arranged to accelerate at least temporarily a flow of grey water passing through the grey-water exchange portion. The pump according to this implementation can operate for brief periods, so as to make the flow turbulent in the grey-water exchange portion, to increase the effectiveness of heat exchange. Moreover, the pump can then be used to discharge waste water, if gravity cannot be used due to lack of space.

Advantageously, the pump is a membrane type suction pump. According to this implementation, it is possible to even contemplate installing a sink or a shower below the discharge conduit, because the suction pump can flow back grey water over a few meters of height.

Another aspect of the invention relates to a heat exchanger of the water-water type comprising:
a grey-water exchange portion arranged to be connected upstream to a drain plug for recovering domestic waste water and downstream to a discharge conduit,
a clean-water exchange portion arranged to be connected upstream to a cold water supply system, and downstream to a distribution valve,
the heat exchanger being arranged to carry out heat transfer between the grey-water exchange portion and the clean-water exchange portion during a water distribution caused by opening the distribution valve, and thus to heat supply water to a first temperature,
wherein the heat exchanger comprises a first heating unit arranged to complete the heating of the supply water simultaneously with the water distribution, to heat the supply water to a second temperature greater than the first temperature,
wherein the heat exchanger comprises a pump arranged to accelerate, at least temporarily, a flow of grey water passing through the grey-water exchange portion, and
wherein the heat exchanger comprises a filtration unit arranged upstream of the pump. The filtration unit can comprise a 1st filtration unit for large pieces, in series with a 2nd filtration unit for small pieces. The filtration unit for large pieces can have a mesh of 2 millimeters, and the filtration unit for small pieces can have a mesh of 0.5 millimeter. This makes it possible to protect the pump. It is possible to contemplate installing these filtration units in a cartridge that can be unscrewed to allow easy cleaning.

Alternatively, the filtration unit comprises a filter, a casing containing the filter, the casing comprising an inlet arranged to be connected to the grey-water recovery drain plug, an outlet arranged to supply the grey-water exchange portion, the filter being arranged between the inlet and the outlet, the casing further comprising a cleaning outlet arranged on the same side of the filter as the inlet, and the exchanger comprising a cleaning valve connecting the cleaning outlet to the discharge conduit, the opening whereof causes cleaning of the filter. This implementation provides for self-cleaning of the filter.

Another aspect of the invention relates to a heat exchanger of the water-water type comprising:

a grey-water exchange portion arranged to be connected upstream to a drain plug for recovering domestic waste water, and downstream to a discharge conduit, a clean-water exchange portion arranged to be connected upstream to a cold water supply system, and downstream to a distribution valve, the heat exchanger being arranged to carry out heat transfer between the grey-water exchange portion and the clean-water exchange portion during water distribution caused by opening the distribution valve, thus heating supply water to a first temperature, wherein the heat exchanger comprises a first heating unit arranged to complete the heating of the supply water simultaneously with water distribution, to heat the supply water to a second temperature greater than the first temperature, and wherein the heat exchanger comprises at least one valve arranged to short-circuit a flow of cold grey water from the grey-water exchange portion, and direct this short-circuited flow directly from the drain plug toward the discharge conduit. This implementation avoids de-priming the device if cold water is ejected, the cold water will not pass through the grey-water exchange portion and is directly ejected toward the discharge conduit.

Another aspect of the invention relates to a heat exchanger of the water-water type comprising:

a grey-water exchange portion arranged to be connected upstream to a drain plug for recovering domestic waste water, and downstream to a discharge conduit, a clean-water exchange portion arranged to be connected upstream to a cold-water supply system and downstream to a distribution valve, the heat exchanger being arranged to carry out heat transfer between the grey-water exchange portion and the clean-water exchange portion during water distribution caused by opening the distribution valve, and thus heating supply water to a first temperature, wherein the heat exchanger comprises a first heating unit arranged to complete the heating of the supply water simultaneously with water distribution, to heat the supply water to a second temperature greater than the first temperature, wherein the each exchange portion has two ends,
wherein the exchanger comprises at each end of each exchanger portion a valve one way whereof is connected to the end of its exchange portion, and
wherein two other ways of each valve of one exchange portion are connected to the rest of the water circuit and to two other ways of the valve of the other end of the exchange portion in question via T connectors, to be able to reverse the flows in each exchange portion. The reversal of the flow makes it possible to de-clog the grey-water exchange portion, by causing reversed travel and by inverting the hot-water inlets and outlets. This makes it possible to dissolve soaps and/or grease and/or biological matter which may have solidified, become attached to or sedimented on the walls of the exchanger. At a minimum, the valves in question are three-way valves.

Another aspect of the invention relates to a heat exchanger of the water-water type comprising:

a grey-water exchange portion arranged to be connected upstream to a discharge valve for recovering domestic waste water, and downstream to a discharge conduit, a clean-water exchange portion arranged to be connected upstream to a cold water supply system, and downstream to a distribution valve, the heat exchanger being arranged to carry out heat transfer between the grey-water exchange portion and the clean-water exchange portion during water distribution caused by opening the distribution valve, and thus heating supply water to a first temperature, wherein the heat exchanger comprises a first heating unit arranged to complete the heating of the supply water simultaneously with water distribution, to heat the supply water to a second temperature greater than the first temperature, and wherein the heat exchanger comprises, downstream of the first heating unit, a valve arranged to direct a flow of hot water toward the distribution valve or toward the grey-water exchange portion. This implementation allows running very hot water (by reducing the flow rate and at the full power of the first heating unit) in the grey-water exchange portion to dissolve solidified soap there for example.

Another aspect of the invention relates to a heat exchanger of the water-water type comprising:

a grey-water exchange portion arranged to be connected upstream to a drain plug for recovering domestic waste water, and downstream to a discharge conduit, a clean-water exchange portion arranged to be connected upstream to a cold water supply system and downstream to a distribution valve, the heat exchanger being arranged to carry out heat transfer between the grey-water exchange portion and the clean-water exchange portion during water distribution caused by opening the distribution valve, and thus to heat supply water to a first temperature, wherein the heat exchanger comprises a first heating unit arranged to complete the heating of the supply water simultaneously with water distribution, to heat the supply water to a second temperature greater than the first temperature, and wherein the heat exchanger comprises a heat storage unit with at least one phase-change material. This implementation makes it possible to limit the use of the second heating unit and to increase the recovery of energy during water distribution, to restore it during temperature maintenance or during the next use.

Another aspect of the invention relates to a heat exchanger of the water-water type comprising:

a grey-water exchange portion arranged to be connected upstream to a drain plug for recovering domestic waste water, and downstream to a discharge conduit, a clean-water exchange portion arranged to be connected upstream to a cold water supply system and downstream to a distribution valve, the heat exchanger being arranged to carry out heat exchange between the grey-water exchange portion and the clean-water exchange portion during water distribution caused by opening the distribution valve, and thus heating supply water to a first temperature, wherein the heat exchanger comprises a first heating unit arranged to complete the heating of the supply water simultaneously with water distribution, to heat the supply water to a second temperature greater than the first temperature, wherein the clean-water exchange portion comprises two outlets, wherein the heat exchanger comprises means for measuring the flow rate for each of the two outlets and means for controlling heating of the first heating unit arranged to control a heating power depending on at least one flow rate of one of the outlets of the clean water exchange portion. According to this implementation, the heat exchanger is capable of controlling a heating power, hence a water temperature, based on the indication of at least one of the flow rates of one of the outlets of the clean water exchange portion. Consequently, there is no need to mix hot water with cold water to control the temperature with a certain overall flow rate, but rather the exchanger according to the present invention makes it possible to adapt the heating power depending on flow rate information from at least one outlet of the clean-water exchange portion.

Advantageously, the flow rate measuring unit comprises two flow meters, each arranged to measure the flow rate of one of the two outlets of the clean-water exchange portion.

Advantageously, the heat exchanger comprises the distribution valve which is a mixer tap with two inlets, each connected to one of the outlets of the clean-water exchange portion, and one outlet delivering domestic water to a user. According to this implementation, the distribution valve is a simple mechanical mixer tap, with one hot water position and one cold water position for the user. However, the two inlets of the mixer tap are directly connected to the clean water exchange portion, but if the user sets the mixer tap to the hot water position, then the flow meter associated with the inlet will measure 100% of the flow passing through a first inlet of the mixer tap, and the control unit will give the command to the first heating unit to operate at full power. On the other hand, if the user sets the mixer tap to the cold water position, the flow meters will give the information that 100% of the flow is running through the other inlet of the mixer tap, and then the control unit will cut off the operation of the first heating unit, which will lower the temperature of the distributed water. Thus the user will continue to use his mixer tap in the traditional manner, just as if he were mixing hot water and cold water, but the exchanger according to the present invention will, however, control the heating power depending on the flow of each of the inlets of the mixer tap.

Advantageously, the exchanger will comprise means for controlling the discharge pump, arranged to control the pump depending on the flow rates measured at each of the outlets of the clean-water exchange portion.

Other features and advantages of the present invention will become more clearly apparent upon reading the detailed description which follows of an embodiment of the invention given as non limiting example and illustrated by the appended drawings, wherein.

Figure 1:
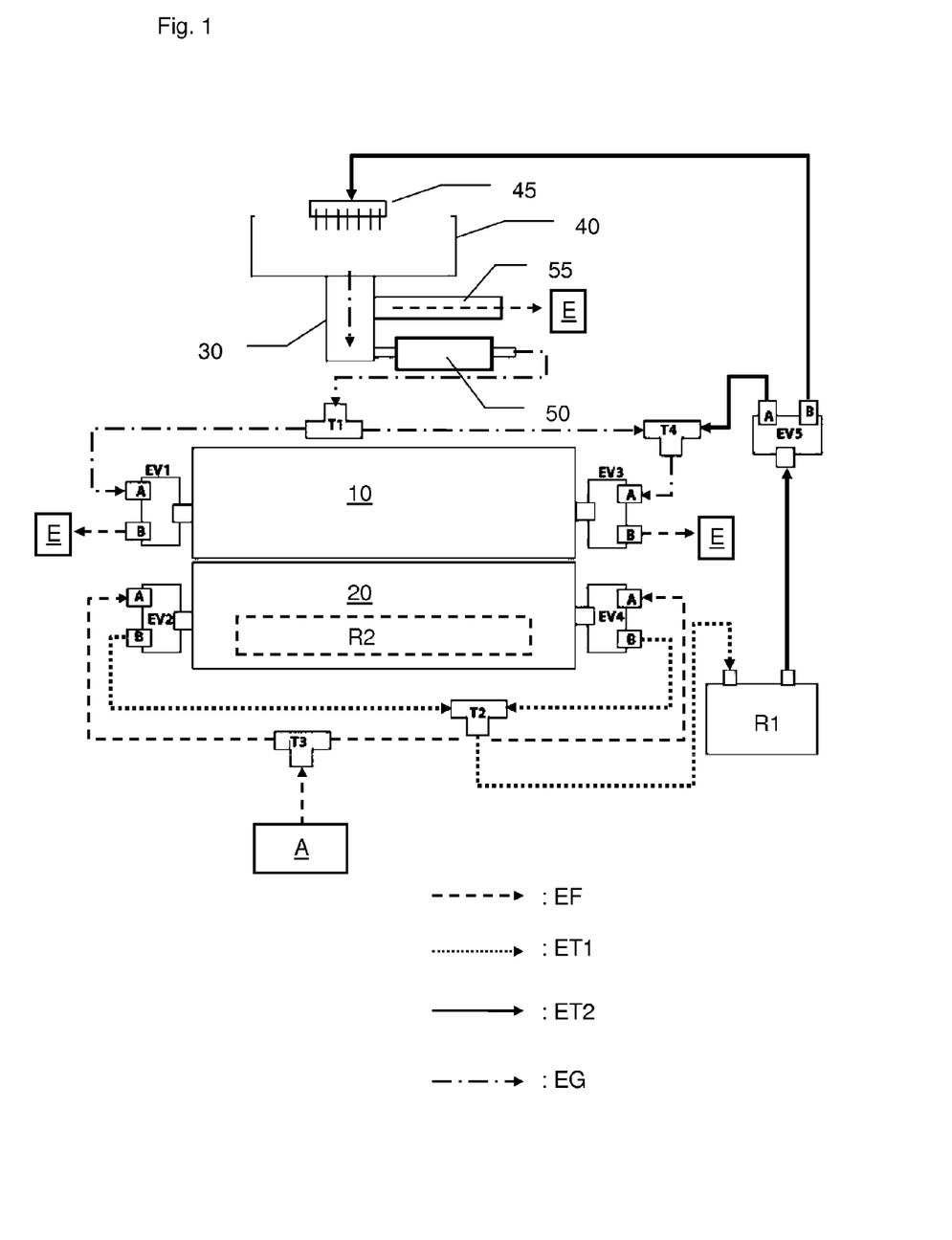
FIG. 1 shows a schematic diagram of the invention.

In the schematic of FIG. 1, the following representation convention has been adopted, as elucidated in the legend of FIG. 1:

lines with large dots represent a cold water conduit EF;
lines with small dots represent a water conduit at a first temperature ET1;
continuous lines represent a water conduit at a second temperature ET2, the second temperature being greater than the first temperature;
mixed lines represent a grey-water conduit EG.

FIG. 1 shows a heat exchanger according to the present invention, which comprises a grey-water exchange portion 10, contiguous to a clean-water exchange portion 20.

Generally, the heat exchanger is supplied with cold water by a supply line A, and rejects waste water (grey water) into a discharge conduit E, having recovered the heat present in the grey water to carry out a first heating to a first temperature of the cold water, and the water at the first temperature is then heated to a second temperature before being distributed. This closed loop operation makes it possible to increase the coefficient of performance (COP) and to limit the power needed to supply the device. Moreover, only one cold water point is necessary, which considerably simplifies the architecture of a building equipped with devices according to the invention.

Moreover, as will be explained below, the heat exchanger is designed to be able to reverse the direction of flow of water in each of its exchange portions, and to be able to inject hot water into the grey-water exchange portion 10, this for the purpose of cleaning the inner walls of the heat exchanger. To this end, each exchange portion 10 and 20 is equipped at each of its ends with three-way valves.

As regards the clean-water exchange portion 20, it is connected at a first end to a three-way valve EV2 and at a second end to a three-way valve EV4. Moreover, each three-way valve EV2 and EV4 of the clean-water exchange portion 20 comprises a way A connected via a T connector T3 to the cold water supply A. Finally, each three-way valve EV2 and EV4 of the clean-water exchange portion 20 comprises a way B connected through a T connector T2 to an electric resistor 31. In summary, the ways A of each three-way valve EV2 and EV4 of the clean-water exchange portion 20 can supply the latter with cold water, and the ways B of each three-way valve EV2 and EV4 of the clean-water exchange portion 20 can supply the electric resistor R1 with water at a first temperature.

Figure 2:
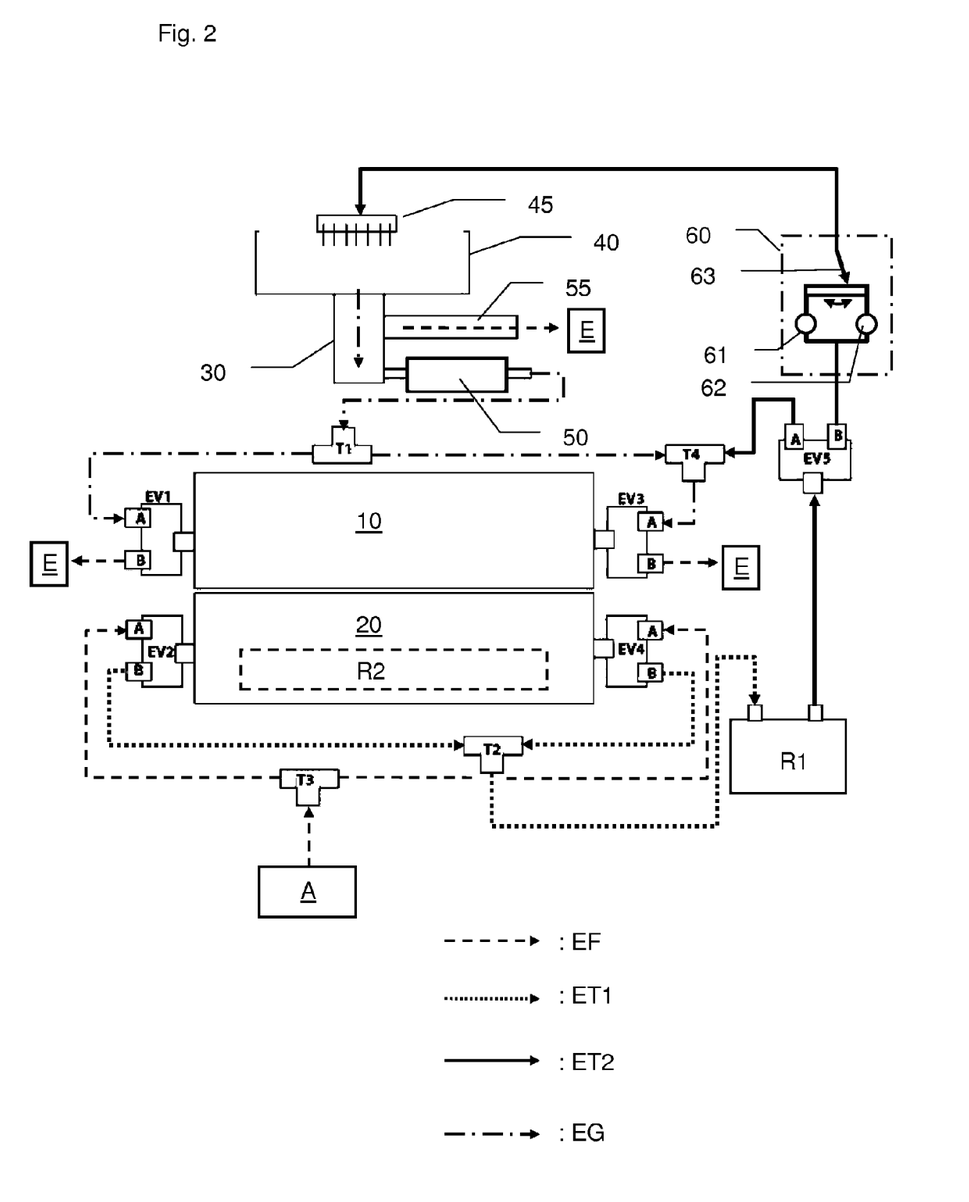
FIG. 2 shows a variant of the device shown schematically in FIG. 1.

In the figures, the electric resistor R1 is represented distinctly from the clean water portion 20, but according to the invention it is part of the exchanger; it can therefore be contiguous with this clean-water exchange portion 20 or even be contained in the latter.

As regards the grey-water exchange portion 10, it is connected at a first end to a three-way valve EV1 and at a second end to a three-way valve EV3. Moreover, each three-way valve EV1 and EV3 of the grey-water exchange portion 10 comprises a way A connected via a T connector T1 to a drain plug 30 for recovering grey water from a shower pan or from a sink for example. Finally, each three-way valve EV1 and EV3 of the grey-water exchange portion 10 comprises a way B connected to the discharge conduit E. In summary, the ways A of each three-way valve EV1 and EV3 of the grey-water exchange portion 10 can supply the latter with grey water, and the ways B of each three-way valve EV1 and EV3 of the grey-water exchange portion 10 can carry the cooled grey water during its passage through the grey-water exchange portion 10 toward the discharge conduit E.

To invert the direction of flow in one of the grey-water exchange portions 10 or the clean-water exchange portion 20, it is sufficient to reverse the opening of the ways A and B of each three-way valve of the exchange portion in question. This will have the effect of inverting the distribution of temperatures, causing dissolution or detachment of internal deposits. The walls remain clean, and it is possible to contemplate reversing the direction of flow between uses, for example.

In order to improve the effectiveness of heat exchange between the exchange portions 10 and 20, a preferred implementation consists of having water circulate in reverse in the exchange portions. For example, if cold water circulates from the three-way valve EV4 toward the three-way valve EV2, then grey water must circulate from the three-way valve EV1 toward the three-way valve EV3.

A pump 50 is installed between the drain plug 30 and the grey-water exchange portion 10, for two reasons. A temporary activation of the pump 50 can easily create turbulent flow conditions in the grey-water exchange portion 10, and thus increase the effectiveness of heat exchange. Moreover, the pump 50 can be used to force discharge of the grey water, even if that is not possible by gravity.

Moreover, a conduit 55 with a valve (not shown) makes it possible to send directly toward the discharge conduit E the flow of water collected by the drain plug 30, if the water is cold. This avoids uselessly cooling the exchange portions 10 and 20.

During the distribution of water, cold water is therefore heated to a first temperature during its passage through the heat exchanger, and the latter comprises a first heating unit (the electric resistor R1) to heat it to a second, so-called comfort temperature, which allows the user to wash.

In order to reduce the priming period, the invention proposes to install, in or around the clean-water exchange portion 20, second a heating unit (an electric resistor R2), to maintain the water contained in the clean-water exchange portion 20 at least at the first temperature, even during long periods of non-use (from one morning to another, for example). Thus, the exchanger remains under the same conditions as those when water distribution operation is established, and at the beginning of the use, after opening the distribution valve (here, the valve EV5), the period for distributing genuinely hot water to a shower head 45 is a few seconds, the time required for the water to travel the distance (less than 2 meters) between the clean-water exchange portion 20 and the shower head 45, while being heated to the second temperature while passing through the electric resistor R1.

Under these conditions of established operation, an electric resistor R1 capable of delivering 3.6 kWh of energy makes it possible to operate the device by being connected to a simple power plug delivering 16 amperes, and an electric resistor R2 delivering at the most 30 Wh is sufficient to maintain the clean-water exchange portion 20 at the first temperature. Under these conditions, a COP of 3 is obtained with a flow rate of 6.5 liters per minute.

Advantageously, thermal insulation of the clean-water exchange portion 20 makes it possible to limit energy inputs for maintaining the clean-water exchange portion 20 at the first temperature, and it is possible to contemplate comprising in the exchanger a heat storage device, with a phase-change material for example, to increase thermal inertia.

Another aspect of the invention relates to de-clogging the grey-water exchange portion 10. To this end, the grey-water exchange portion 10 is equipped with three-way valves EV1 and EV2, which make it possible to reverse the direction of flow. This action has the effect of reversing the distribution of temperatures inside the grey-water exchange portion 10, which can help dissolve soap, grease or biological particles and drive them toward the discharge conduit E. At the same time, the direction of flow in the clean-water exchange portion 20 will also be reversed.

As a supplement, the exchanger comprises a three-way valve EV5 downstream of the electric resistor R1, to direct the flow of hot water toward the shower head 45 or toward way A of the valve EV3 through a T connector T4. In this case, it is possible to contemplate limiting the flow rate of hot water so that the resistor R1 heats the water beyond the second temperature, to a third temperature which can be 75° C. for example. When water at the third temperature directed toward the grey-water exchange portion 10 enters it, deposits will be dissolved and discharged toward the discharge conduit E. It is also possible to contemplate freeing the flow temporarily to obtain flow under considerable pressure and rapid flow rate which will complete the cleaning of the grey-water exchange portion 10. In fact, for the sake of effectiveness of heat exchange, it is important to have the grey-water exchange portion 10 as clean as possible.

These cleaning cycles can be programmed to occur, for example, in the middle of the night.

The invention can be easily incorporated into a small volume such as a cube, which would appear as a box with only one cold water inlet, one hot water outlet and one electrical outlet. The installation is then particularly easy, and makes it possible to create a distribution point for hot water, even in buildings or places which do not have a hot-water circuit. To supply a shower with a flow rate comprised between 6 and 7 liters of water at 38° C., it is possible to contemplate accommodating the exchanger with its exchange portions, its three-way valves and the heating unit in a cube 40 centimeters on a side.

FIG. 2 shows a variant of the device shown schematically in FIG. 1. Only a mixer tap 60 has been added between the valve EV5 and the shower head 45.

Only the operation of the mixer tap 60 will be described, the rest being identical to FIG. 1. The mixer tap 60 is added to give the user a known and practical mechanical control interface. The mixer tap 60 comprises two inlets each with a flow meter 61 and 62, as well as a control lever 63 which makes it possible to have the water flow at the outlet of the clean water exchange portion pass into one or the other of the inlets of the mixer tap. The inlet having flow meter 61 can be assigned the "hot water" function and the inlet having flow meter 62 the "cold water" function.

The invention consists of measuring the flow rate which passes into each inlet, and to make the heating power dependent of the resistor R1 dependent on the ratio of flow rates in each inlet of the mixer tap. Thus, if the user decides to put the mixer tap in the hot water position and direct the lever so as to have all the flow pass through flow meter 61, the latter will detect it and the heating resistor R1 will then be set to full power, to heat the water fully. On the other hand, if the user decides to position the lever 63 so as to have all the flow pass through the flow meter 62, the latter will detect it (or flow meter 61 will detect a flow rate of 0%), and the resistor R1 will be disconnected so as not to further heat the distributed water.

Between these two extreme positions, the user can position the lever 63 anywhere, and heating will be calculated and carried out in the same proportion as the ratio of the flow rates passing through flow meters 61 and 62. In other words, the adjustment of the final temperature is carried out not by mixing cold water with hot water, but on the basis of the measurement of flow rates controlled mechanically by the user, to adjust heating power. It is also possible to use these required flow rate values to control the discharge speed of the pump 50.

It will be understood that various modifications and/or obvious improvements for one skilled in the art may be made to the different embodiments of the invention described in the present description without departing from the scope of the invention as defined by the appended claims. In particular, reference is made to a plate-type water-water exchanger; an exchanger with tubes, with U-shaped tubes, with a horizontal or vertical, spiral or block tubular manifold may be contemplated.

The invention claimed is:

1. A heat exchanger of the water-water type comprising:
    a grey-water exchange portion arranged to be connected upstream to a drain plug for recovering domestic waste water, and downstream to a discharge conduit;
    a clean-water exchange portion arranged to be connected upstream to a cold water supply system, and downstream to a distribution valve, wherein the grey-water portion and the clean-water exchange portion are arranged to carry out heat transfer between the grey-water exchange portion and the clean-water exchange portion during water distribution caused by opening the distribution valve, and thus heating supply water to a first temperature;

a first heating unit arranged within the clean-water exchange portion to complete the heating of the supply water simultaneously with water distribution, to heat a supply water to a second temperature greater than the first temperature; and a second heating unit arranged within the clean-water exchange portion to maintain, for a period without water distribution, the clean-water exchange portion and the water contained therein at a temperature at least equal to or greater than the first temperature, wherein each of the grey-water exchange portion and the clean-water exchange portion has two ends, and each of the two ends of the grey-water exchange portion and each of the two ends of the clean-water exchange portion is connected to one way of a corresponding valve, and wherein a second way of each valve is connected to the rest of the water circuit and a third way of each valve of the other end of the exchange portion in question through T connectors, to be able to reverse the flows in each exchange portion.

2. The heat exchanger according to claim 1, wherein the first heating unit comprises an electric resistor arranged to produce at least 3 kWh of energy when it is supplied with a first supply current, and wherein the second heating unit comprises a potentiometer connected in series with the electric resistor, to limit the first supply current and cause the electric resistor to produce no more than 30 Wh of energy.

3. The heat exchanger according to claim 1, further comprising a thermal insulation unit arranged to thermally insulate at least the clean-water exchange portion.

4. The heat exchanger according to claim 1, further comprising a pump arranged to accelerate at least temporarily a flow of grey water passing through the grey-water exchange portion.

5. The heat exchanger according to claim 1, further comprising a controller to control flow rate, wherein the controller is arranged for controlling a discharge flow rate of grey water out of the grey-water exchange portion depending on a grey-water inlet flow rate in the grey-water exchange portion.

6. The heat exchanger according to claim 1, further comprising at least one valve arranged to short-circuit a flow of cold grey water from the grey-water exchange portion, and direct the flow of cold grey water that has been short-circuited directly from the drain plug toward the discharge conduit.

7. The heat exchanger according to claim 1, further comprising, downstream of the first heating unit, a valve arranged to direct a flow of hot water toward the distribution valve or toward the grey-water exchange portion.

8. The heat exchanger according to claim 1, further comprising a heat storage unit with at least one phase-change material.

9. A device for distributing domestic water comprising:
a water receiver selected from the group consisting of a sink and a shower pan; and
a heat exchanger of the water-water type that receives water from the water receiver, the heat exchanger comprising:
a grey-water exchange portion arranged to be connected upstream to a drain plug for recovering domestic waste water, and downstream to a discharge conduit;
a clean-water exchange portion arranged to be connected upstream to a cold water supply system, and downstream to a distribution valve, wherein the grey-water portion and the clean-water exchange portion are arranged to carry out heat transfer between the grey-water exchange portion and the clean-water exchange portion during water distribution caused by opening the distribution valve, and thus heating supply water to a first temperature;
a first heating unit arranged within the clean-water exchange portion to complete the heating of the supply water simultaneously with water distribution, to heat a supply water to a second temperature greater than the first temperature; and
a second heating unit arranged within the clean-water exchange portion to maintain, for a period without water distribution, the clean-water exchange portion and the water contained therein at a temperature at least equal to or greater than the first temperature, wherein each of the grey-water exchange portion and the clean-water exchange portion has two ends, and each of the two ends of the grey-water exchange portion and each of the two ends of the clean-water exchange portion is connected to one way of a corresponding valve, and wherein a second way of each valve is connected to the rest of the water circuit and a third way of each valve of the other end of the exchange portion in question through T connectors, to be able to reverse the flows in each exchange portion.

* * * * *